(12) United States Patent
Kirstätter

(10) Patent No.: US 8,857,251 B2
(45) Date of Patent: Oct. 14, 2014

(54) BRAKE TEST STAND

(75) Inventor: Klaus Kirstätter, Wetzlar (DE)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 201 days.

(21) Appl. No.: 13/371,308

(22) Filed: Feb. 10, 2012

(65) Prior Publication Data

US 2012/0204632 A1  Aug. 16, 2012

(30) Foreign Application Priority Data

Feb. 10, 2011 (EP) ..................................... 11154017

(51) Int. Cl.
*G01M 17/02* (2006.01)
*B60T 17/22* (2006.01)
*G01L 5/28* (2006.01)
*G01M 17/007* (2006.01)
*B60C 11/24* (2006.01)

(52) U.S. Cl.
CPC ................ *G01L 5/282* (2013.01); *B60T 17/22* (2013.01); *G01M 17/0074* (2013.01); *B60C 11/24* (2013.01)
USPC .......................................................... 73/123

(58) Field of Classification Search
USPC ........................ 73/116.06, 116.08, 123, 126
See application file for complete search history.

(56) References Cited

U.S. PATENT DOCUMENTS

| | | | | |
|---|---|---|---|---|
| 4,024,756 A | * | 5/1977 | Cline ............................... | 73/132 |
| 5,467,646 A | * | 11/1995 | Douine et al. .................. | 73/126 |
| 5,987,978 A | * | 11/1999 | Whitehead ...................... | 73/146 |
| 6,012,329 A | * | 1/2000 | Kelm-Klager et al. .......... | 73/146 |
| 6,069,966 A | * | 5/2000 | Jones et al. ..................... | 382/100 |
| 7,104,122 B2 | * | 9/2006 | Kurai et al. ...................... | 73/146 |
| 7,752,903 B2 | * | 7/2010 | Seibl ............................... | 73/123 |
| 2005/0188753 A1 | * | 9/2005 | Kurai et al. ...................... | 73/146 |
| 2008/0022761 A1 | * | 1/2008 | Seibl ............................... | 73/126 |
| 2008/0041147 A1 | * | 2/2008 | David ............................. | 73/117 |
| 2010/0180676 A1 | * | 7/2010 | Braghiroli et al. .............. | 73/146 |
| 2012/0060597 A1 | * | 3/2012 | Lee et al. ........................ | 73/121 |

FOREIGN PATENT DOCUMENTS

| | | |
|---|---|---|
| DE | 196 35 194 | 4/1998 |
| DE | 10 2009 016 498 | 10/2010 |
| EP | 0 816 799 | 1/1998 |
| WO | 9610727 A1 | 4/1996 |
| WO | WO 98/34090 | 8/1998 |
| WO | 2009031087 A1 | 3/2009 |

OTHER PUBLICATIONS

Extended European Search Report for Application No. 11154017.5-1236 dated Jul. 15, 2011.

* cited by examiner

*Primary Examiner* — Eric S McCall
(74) *Attorney, Agent, or Firm* — McDermott Will & Emery LLP

(57) ABSTRACT

A brake test stand for testing vehicle brakes and for determining the brake forces acting on the respective vehicle wheel. The brake test stand comprises first and second pairs of rollers for positioning the two wheels mounted on a common axis of a vehicle thereon, wherein the rollers of each pair of rollers are arranged opposite to each other and the pairs of rollers are provided side by side. A control unit controls the test stand. First sensing devices are positioned respectively below and between the rollers of each pair of rollers for sensing the pattern of the running surface of each of the tires of the wheels mounted on the common axis. A processing and calculation unit processes the data obtained by the first sensing devices for calculating tire conditions based on a correlation of the data of the coaxially mounted tires.

17 Claims, 3 Drawing Sheets

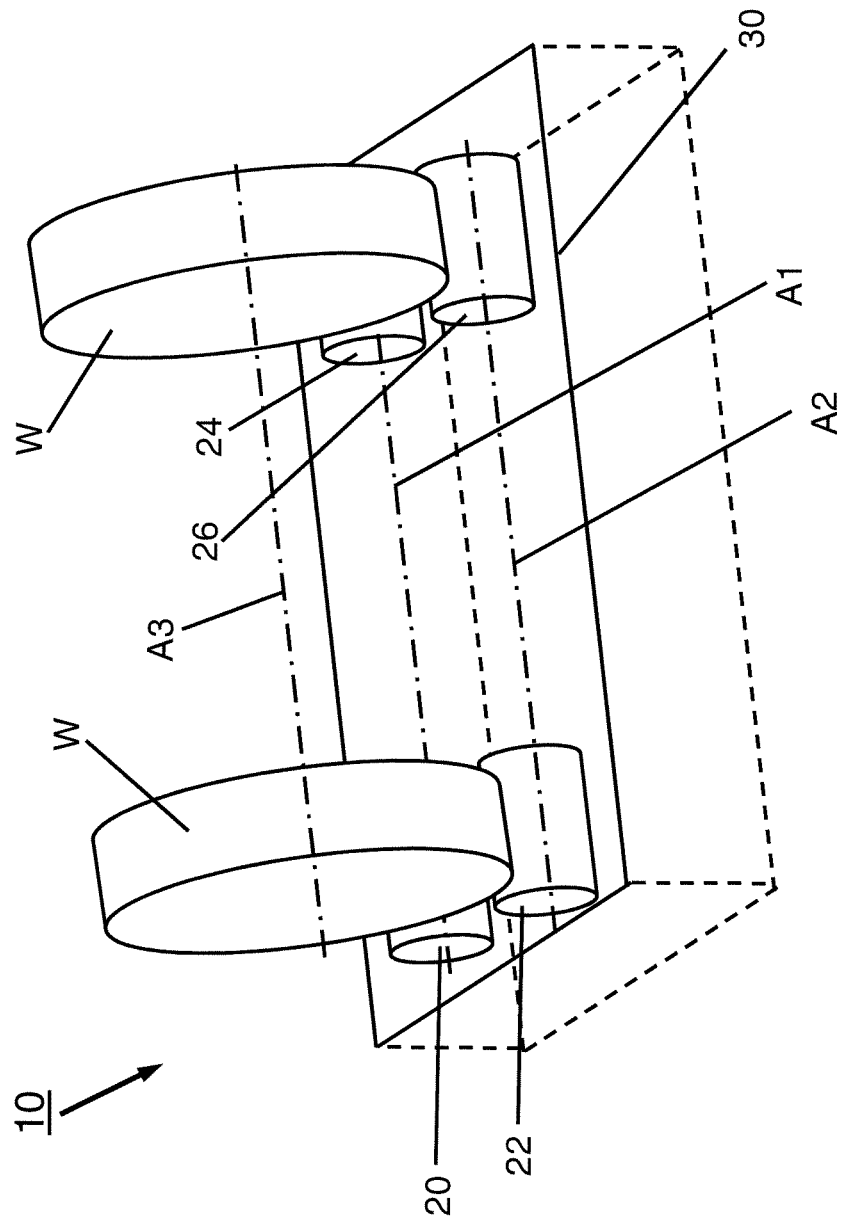

BRAKE TEST STAND

CROSS-REFERENCE TO RELATED APPLICATION

This application claims priority under 35 U.S.C. §119 to European Patent Application No. 11 154 017.5 filed Feb. 10, 2011.

TECHNICAL FIELD

The present invention relates to a brake test stand for testing vehicle brakes as well as a method for testing wheels on a brake test stand.

In particular, the present invention relates to a brake test stand for testing vehicle brakes and for determining the brake forces acting on the respective vehicle wheel. The brake test stand comprises at least a first and a second pair of rollers for positioning the two wheels mounted on a common axis of a vehicle thereon, wherein the rollers of each pair are arranged opposite to each other and the pair of rollers are provided side by side, a control unit for controlling the test stand, and first sensing devices positioned respectively below and between the rollers of each pair of rollers for sensing at least the pattern of the running surface of each of the tires of the wheels mounted on the same axis. Furthermore, the present invention relates to a method for testing wheels on a brake test stand and for determining the brake forces acting on the respective vehicle wheel.

BACKGROUND

Brake test stands are known e.g. from DE patent 196 35 194. Said known brake test stand comprises two rollers arranged parallel to each other, on which a vehicle wheel is positioned. One of the rollers is driven by a respective drive while the vehicle wheel, positioned thereon, is braked. The function of the vehicle brake is estimated on the basis of the braking force acting on the roller.

From DE laid open document 10 2009 016 498, a device and a method for measuring the tread profile of a tire which is mounted on a vehicle wheel is known. The tire to be tested stands on a surface wherein the tire is deformed due to the weight of the vehicle. A light emitter is arranged in front of the tire and emits light in an acute angle to the tire. A sensor which may be a two-dimensional camera, detects the reflected light and creates a tread profile. Based on said profile, tire conditions may be estimated.

From PCT patent application WO 98/34090, a method and a device for measuring the tread depth of a tire mounted on a vehicle is known. The vehicle wheel is positioned on two rotatable rollers. A linear light beam is directed to the surface of the tire from a light source positioned below the rollers. The light source is aligned between the rollers and approximately vertically below the wheel positioned on said rollers. The reflected light beam is sensed by an image defining sensor so as to obtain data related to the tread depth of the tire. During the measurement operation, the tire is rotated to obtain data from various places on the tire or of the complete running surface of the tire.

In EP patent application 0 816 799, diagnostic information regarding the tire tread, balance conditions and the wheel alignment are captured by a contactless measurement of the tire tread. A laser beam or stripe, respectively, is directed to the running surface and the side walls of the tire during a complete revolution of the vehicle wheel. The vehicle wheel may be mounted on a wheel balancer on a known brake test stand including rollers on which said wheel is positioned. A tire tread image is created and, based on said tire tread image, characteristics of the tire conditions are determined, such as the tread depth or wheel alignment.

In the known wheel diagnostic systems, brake test stands and wheel balancers, each wheel or tire is tested separate from each other wheel or tire of the same vehicle. Moreover, on a brake test stand, including a single roller or a pair of rollers, on which both wheels mounted on the same axis, are positioned, the brake force measurement of each of said two wheels is influenced by the respective other wheel.

Thus, it is an object of the present invention to provide a brake test stand and a method for testing vehicle brakes, with which the diagnostic measurement of vehicle wheels, in particular, the accuracy of the measurement results is improved.

SUMMARY

In accordance with the present invention, a test stand for testing vehicle brakes and for determining the brake forces acting on the respective vehicle wheel. The brake test stand comprises at least a first and a second pair of rollers for positioning the two wheels mounted on an axis of a vehicle thereon, wherein the rollers of each pair are arranged opposite to each other and the pair of rollers are provided side by side, a control unit for controlling the test stand, and first sensing devices positioned respectively below and between the rollers of each pair of rollers for sensing at least the pattern of the running surface of each of the tires of the wheels mounted on the common axis. By arranging the sensing devices between both rollers of each pair of rollers, the sensing devices can scan the running surface of the respective tire in an undeformed condition of the tire and can scan the tire running surface in a viewing and sensing direction at least substantially perpendicular to the running surface of the tire.

In the inventive brake test stand, a processing and calculation unit is provided, being adapted to process the data obtained by the first sensing devices for calculating tire conditions on the basis of a correlation of the data of the tires of the wheels mounted on the common axis. While correlating the data of the tires, a possible failure in the chassis suspension of the vehicle, in particular in the vehicle brakes, the wheel alignment, the wheel balance etc. may be considered and the necessary changes in the conditions of the chassis suspensions may be adjusted with regard to the wheels mounted on the same axis.

In an advantage embodiment of the inventive brake test stand, the first sensing devices are coupled to and controlled by the control unit of the brake test stand. In this configuration, e.g. begin and end of the sensing operation may be adjusted to the operation of the brake test stand to effective and accurate sense the tire positioned on the break test stand.

The first sensing devices may be formed by various means. In a preferred embodiment, the first sensing devices are a light bar sensor forming strip of light for scanning the running surface of the tire. The sensing and/or scanning width of the first sensing devices can be such that the broadest possible tire can be examined. However, it is also possible that the sensing and/or scanning width of the first sensing device is smaller than the width of the broadest possible tire. In such a case or independent from that latter, it is possible that the first sensing devices can be adjusted in their positions parallel to the axis of rotation of the rollers of the pair of rollers and/or perpendicular to these axis of rotation. Moreover, additionally or alternatively, the first sensing devices can have means for adjusting the width of the radiations or light beam emitted therefrom. Moreover, the first sensing devices may sense the tread depth.

In a further preferred embodiment, additional sensors i.e. second sensing devices may be arranged laterally to the first sensing devices for sensing the side walls of the tire, to detect damages in the side walls. For these second sensing devices, an adjustment of this positions and/or the width of the emitted radiation beam can, similar to the first sensing device, preferably also be provided.

The second sensing devices sense structure of the side walls of the tire. By arranging the sensing devices between both rollers of each pair of rollers, the sensing devices can scan the running surface of the respective tire in an undeformed condition of the tire and can scan the tire running surface in a viewing and sensing direction at least substantially perpendicular to the running surface of the tire. In order to improve the measurement results, the first sensing devices or second sensing devices, respectively, may sense the tread depth, at least in the lateral region of the running surface of the tire.

Based on the sensing results, the processing and calculation unit is adapted to calculate and create at least one image of the running surfaces of the tires. On basis of said one or several images, irregularities in the tread wear leading to imbalances of the tire or being an indicator that the alignment of the wheels is incorrect may be detected.

Pattern on the side walls of the tire may be detected, which include information regarding the tire, like the manufacturer, the kind of the tire or the year of construction.

In an additional advantageous embodiment, the processing and calculation unit is further adapted to calculate the data for executing a wheel alignment on the basis of the data obtained by the sensing devices. Based on said calculation, a decision regarding a possibly necessary wheel adjustment may be made.

In a further advantageous configuration, the first and/or the second sensing devices comprise means for adjusting their position at least perpendicular and/or parallel to the axis of rotation of the rollers of the brake test stand. Said adjusting means allow an exact adjusting of the sensing devices relative to the vehicle wheels positioned on the rollers of the test stand, whereby the accuracy of the measurement results may be enhanced.

The sensing devices emit linear light beams. As an example thereof, the first sensing devices may emit a fan-shaped light beam. In order to adapt the break test stand to the specific wheel positioned on the rollers, the first sensing devices comprise means for adjusting at least the width of the fan shaped light beam. Naturally, also the second sensing devices, when emitting fan-shaped light beams, may comprise means for adjusting the width of the of said fan shaped light beam. Said adjusting means may comprise optical elements like lenses, which are movable relative to each other. By adjusting the width of the fan-shaped light beams e.g. to the width of the wheel positioned on the rollers of the break test stand, the complete running surface and the side surfaces ma be scanned and the accuracy of the measurement results may be enhanced.

Moreover, there is provided a method for testing wheels on a brake test stand and for determining the brake forces acting on the respective vehicle wheel. The method comprises the steps of positioning the two wheels of a vehicle mounted on a common axis of said vehicle on a first and a second pair of rollers of the brake test stand, driving at least one of the rollers of the two pairs of rollers, sensing at least the pattern of the running surface of each of the tires by sensing devices positioned below and between the rollers during a run of the wheels for testing purposes, and processing the data obtained by the sensing devices and calculating tire conditions on the basis of a correlation of the data of the tires mounted on said common axis by a processing and calculation unit.

Advantageously, the method further comprises the step of outputting a massage for the further treatment of the tires on the basis of the calculated tire conditions.

Furthermore, the calculated tire conditions may include wheel alignment information, on the basis of which a decision may be made whether a balance operation is necessary or not.

The method further comprises the step of executing a wheel alignment on the basis of the data obtained by the sensing devices on the basis of which a decision may be made whether an alignment operation is necessary or not.

Further advantageously, the method comprises the step of adjusting the position the first sensing devices and/or the width of the fan-shaped light beam emitted by the first sensing devices after the two wheels of a vehicle mounted on a common axis of said vehicle have been positioned on the first and second pair of rollers of the brake test stand.

The inventive method for testing wheels on a brake test stand provides the same advantages as disclosed in conjunction with the inventive brake test stand.

Further advantages and a preferred embodiment will be described in the following together with the drawings listed below. The expressions "left", "right", "below" and "above" are referred to the drawings in an alignment such that the reference numbers used can be read in a normal orientation.

BRIEF DESCRIPTION OF THE DRAWINGS

In the drawings:

FIG. 1: is a schematic and perspective view of an embodiment of a brake test stand according to the present invention;

DETAILED DESCRIPTION

Figure 2A:
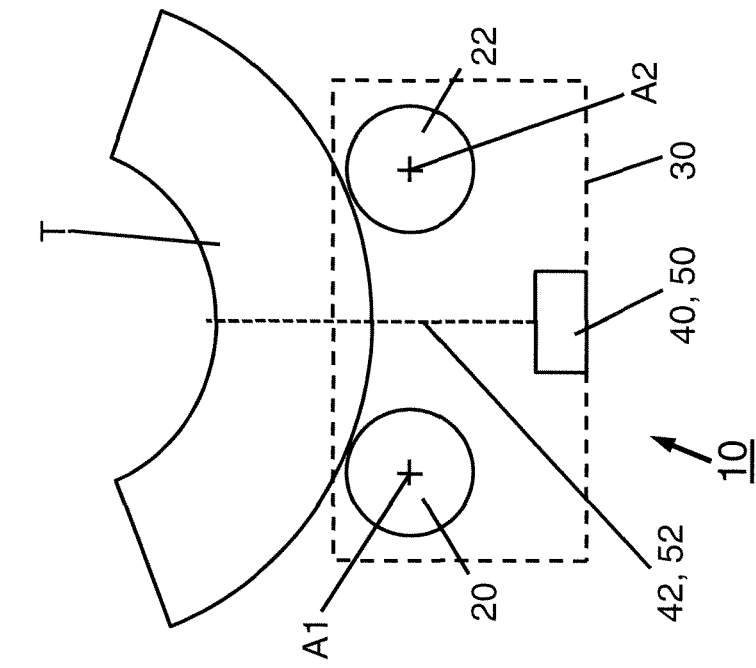
FIG. 2a: is a cross-sectional view of the brake test stand according to FIG. 1, in a vertical plane through the axis of vehicle wheels positioned on a first pair of rollers of the brake test stand.

FIG. 1 shows a schematic and perspective view of an embodiment of a brake test stand 10 according to the present invention. Brake test stand 10 includes a first and a second pair of rollers 20, 22; 24, 26 each of which has a at least substantially a cylindrical shape. The rollers 20, 22 can be made of steel wherein the running surface of each cylinder, or at least one of each pair 20, 22; 24, 26 can be covered with a covering made of rubber or plastics, respectively, in order to increase the friction between the wheels W of the vehicle to be tested and the rollers 20, 22, 24, 26. Additionally or alternatively, at least one roller 20, 22, 24, 26 of each pair of rollers 20, 22; 24, 26 can have a structure for increasing the friction between the wheels W of the vehicle to be tested and the rollers 20, 22, 24, 26. Alternatively, each roller 20, 22, 24, 26 of each pair of rollers 20, 22; 24, 26, or at least one roller 20, 22, 24, 26 of each pair or rollers 20, 22; 24, 26 can be made of plastics wherein the surface of at least one roller 20, 22, 24, 26 of each pair 20, 22; 24, 26 can have a structure for an increase of the friction between the wheels W of the vehicle to be tested and the rollers 20, 22, 24, 26. Rollers 20, 22 of the first pair of rollers 20, 22 are coaxially aligned to rollers 24, 26 of the second pair of rollers 24, 26. Moreover, rollers 20, 24 and 22, 26, respectively, of each pair 20, 22; 24, 26 being arranged adjacent to each other have a common axis of rotation A1, A2. The axis of rotation A1, A2 are aligned parallel to each other and in a common horizontal plane.

Rollers 20, 22, 24, 26 of both pair of rollers 20, 22; 24, 26 are accommodated in a boxlike housing 30 which is opened at its top side and which is preferably made of hot dip galvanized metal sheet. The opening is such that the rollers 20, 22, 24, 26 of each pair 20, 22; 24, 26 can accommodated one wheel W of the wheels W being arranged on a common axis of the vehicle to be tested between each other. At least one roller 20, 24, 22, 26 of each pair of rollers 20, 22; 24, 26 is driven by a respective drive (not show in FIG. 1), like an electric motor.

As it further can be seen from FIG. 1, schematically shown the vehicle wheels W are positioned on rollers 20, 22, 24, 26. Wheels W are mounted on a common axis of the vehicle and are rotatable about a common axis of rotation A3 being located above the axis of rotation A1, A2 of the rollers 20, 22, 24, 26 and between these two axis of rotation A1, A2.

FIG. 2a shows a cross-sectional view of the brake test stand 10, in a vertical plane through the axis A1 of the vehicle wheels W positioned on the first pair of rollers 20, 22 of the brake test stand 10. In FIG. 2a, only roller 20 is visible.

As it can further be seen in FIG. 2a, a first sensing device 40 is arranged at least substantially centrally below roller 20 in the bottom region of housing 30. First sensing device 40 is positioned approximately vertically below the expected position of vehicle wheel W so that the scanning radiation emitted from the first sensing device 40 can be emitted in a direction at least substantially perpendicular to the running surface of the tire. First sensing device 40 emits a fan-shaped light bar 42 directed vertically upwardly towards the running surface of tire T of wheel W, forming a strip of light on the running surface of tire T, which is aligned parallel to the axis of rotation A1, A2 of rollers 20, 22 and thus, also parallel to axis A3 of wheel W. The fan-shaped light can have a width corresponding to the width of the running surface of the tire to be inspected. Alternatively or additionally, the first sensing device 40 can have means for adapting the width of the fan-shaped light in order to adjust the fan-shaped light to the width of tire to be inspected. Moreover, also additionally or alternatively, there can be means for adjusting the position of the first sensing device 40 parallel to the axis of rotation A1, A2 of the rollers 20, 22, 24, 26 and/or perpendicular to them. Sensing device 40 includes a radiation source, like a laser for emitting a respective light beam, and respective optical elements for forming fan-shaped light bar 42 from said light or laser beam.

Additionally, further or second sensing devices 50 may be provided, arranged laterally on both or at least one side of each of the two first sensing devices 40. Lateral or second sensing devices 50, according to FIG. 2a, are positioned besides sensor device 40 and also in the bottom region of housing 30 (shown in dotted lines). Lateral sensing devices 50 also include a radiation source corresponding to that of first sensing devices 40, like a laser for emitting a respective light beam. Second sensing devices 50 include optical elements for forming a fan-shaped light bar 52. Second sensing devices 50 are aligned in a manner that light bars 52 are directed to the respective side wall of tire T and to form an at least approximately vertical strip of light on the side wall of tire T. The second sensing devices 50 can also have means for adjusting their positions parallel to and/or perpendicular to the axis of rotation A1, A2 of the rollers 20, 22, 24, 26. Moreover, the second sensing devices 50 can additionally and/or alternatively have means for adjusting the width of the radiation beam or light beam, respectively.

As it also can be inferred from FIG. 2a, fan-shaped light bars 42, 52 are aligned to each other, to overlap in the region between the running surface and the side walls of tire T, in order to link sensor signals of first and second sensing devices 40, 50 to each other.

Figure 2B:
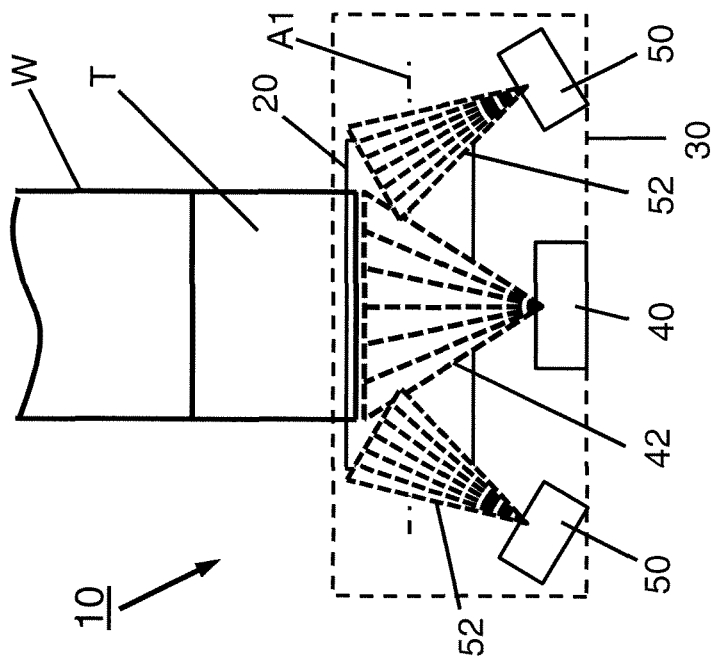
FIG. 2b: is a cross section view of the brake test stand according to FIG. 1, in a vertical plane perpendicular to the axis of the vehicle wheels positioned on the first pair of rollers of the brake test stand.

FIG. 2b is a cross-sectional view of the brake test stand 10, in a vertical plane perpendicular to axis A3 of vehicle wheels W positioned on the first pair of rollers 20, 22 of the brake test stand 10. As it can be seen in FIG. 2b, first and second sensing devices 40, 50 are arranged in the bottom section of housing 30 and aligned in a line parallel to axis A1, A2 of rollers 20, 22. Moreover, fan-shaped light bars 42, 52 are emitted vertically from sensing devices 40, 50 and in a common plane. Wheel W is positioned on rollers 20, 22 in a manner that its axis A3 not shown in FIG. 2b, is arranged vertically above sensing devices 40, 50 and approximately in the plane defined by fan-shaped light bars 42, 52.

It has to be understood that sensing devices 40, 50 not only comprise radiation sources for emitting light, but also include receiving means for receiving the radiation reflected by the running surface and the side walls of the tires T, respectively. It is also possible to arrange the receiving means separated from the emitting means.

The first and second sensing devices 40, 50 can be arranged in housings not shown allowing the emitting of light and receiving of light reflected by the tire T and protecting the sensing devices 40, 50 from moisture and mud.

Figure 3:
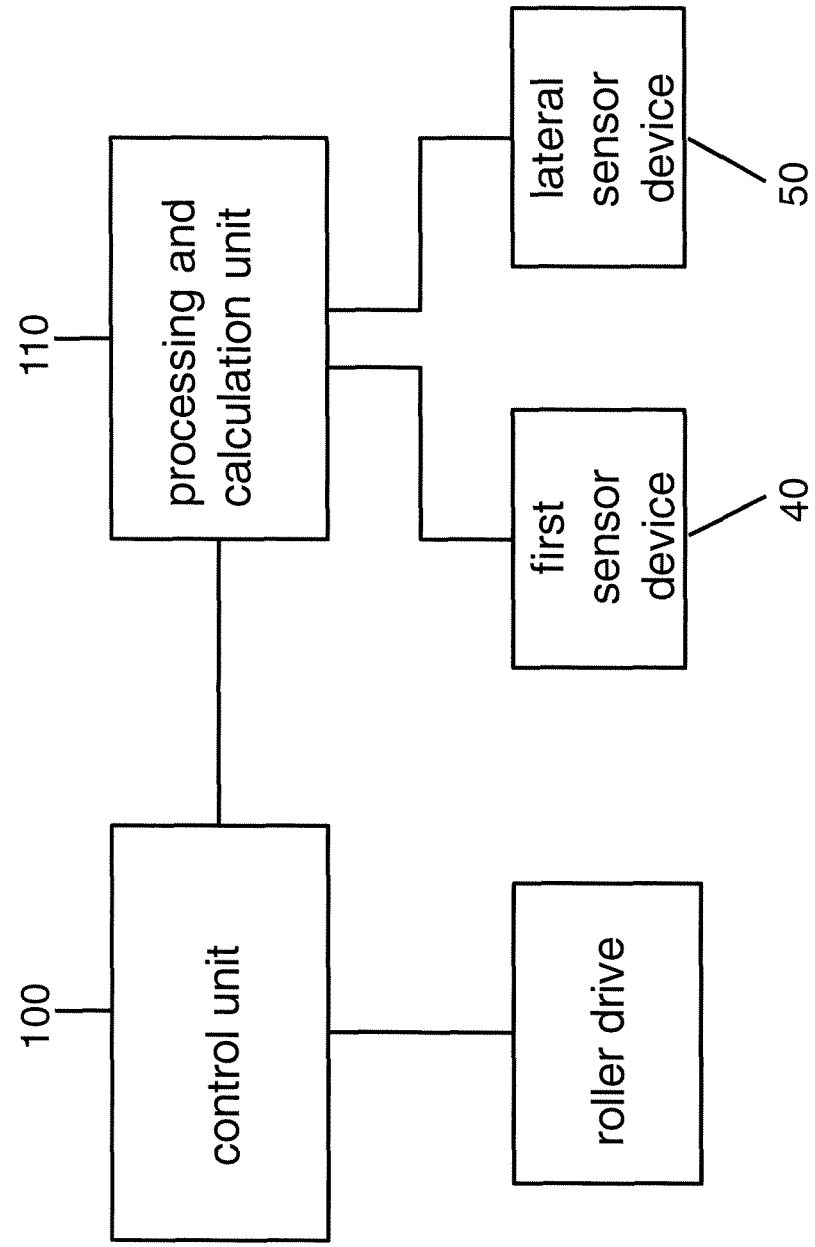
FIG. 3: is a block diagram of the brake test stand according to the present invention.

FIG. 3 is a block diagram of the brake test stand 10. Brake test stand 10 comprises a control unit 100 for controlling brake test stand 10, which is coupled at least to the drives of rollers 20, 22, 24, 26 in order to start and stop said drives, to control drive speed and to control the duration of a test run. Coupled to control unit 100, a processing and calculation unit 110 is provided, which is coupled to the first and second sensing devices 40, 50.

In operation, a vehicle to be tested is positioned with its wheels W mounted on a common axis of said vehicle on the rollers 20, 22, 24, 26 as shown in FIG. 1. For testing the vehicle brakes, at least one of the rollers of each pair of rollers 20, 22; 24, 26 is, controlled by control unit 100, driven by a respective drive. Thereafter, the brake of the vehicle is activated and, based on the brake force applied to the rollers 20, 22, 24, 26, the function and condition of the vehicle brakes are analyzed.

At the same time or before or after the testing run for the brakes, also controlled by control unit 100, sensing devices 40, 50 sense the running surfaces and the side walls of tire T of wheels W for at least about one revolution of wheels W. Signals of sensing devices 40, 50, corresponding to the reflected radiation, are transferred to processing and calculation unit 110 to be analyzed.

Based on the signals of sensing devices 40, 50, in processing and calculation unit 110, images of the running surfaces of the wheels W and preferably additionally of at least one or both side walls of the tires T of the wheels W, are created, including e.g. the tread depth.

The analysis of the data received from the scanning operation executed by sensing devices 40, 50 includes a correlation of the data of both wheels W positioned on first and second pair of rollers 20, 22; 24, 26 of brake test stand 10. Based on the information received from the tire pattern, condition of the tire may be estimated regarding possible imbalances, a fault of in the alignment of the wheels W of the vehicle to be tested, defects in the running surfaces or side walls of tire T, respectively.

While correlating the data of both wheels W, a possible mutual influence of one wheel W to the other, may be considered and included into the necessary changes to the brakes or a balancer operation.

This analysis is executed by correlating the variations in the brake force applied to rollers 20, 22 of brake test stand 10 and the changes or variations, respectively, in the pattern of the tread profile of the one wheel W positioned on rollers 20, 22 to the variations in the brake force applied to rollers 24, 26 and the changes or variations in the pattern of the tread profile of the other wheel W positioned on rollers 24, 26. This correlation may identify differences between the conditions of both wheels W and possible necessary adjustments may be harmonized with this information considering the mutual influence of the wheels W mounted on the common axis. Thereby, said correlated adjustments may vary from adjustments which would be made on the basis of tests to a single wheel independent from the test results of the respective other wheel mounted on the same axis.

Additionally, specific characteristics of the tires T may be detected, like marks on the side wall regarding the kind (e.g. winter or summer wheel) of the tires, the manufacturer or the year of construction etc.

Accordingly, based on the analysis of all data, not only an adjustment of the vehicle brakes is possible, but also suggestions may be made regarding the wheel alignment, the balance conditions and other conditions of the wheels may be made, including an advice whether or not a balancer operation is necessary.

Threshold values are provided for possible differences between the conditions of both wheels W mounted on the same axis, on the basis of which decisions may be made, whether a wheel alignment or balancer operation is still possible or allowable.

The brake test stand 10 or the control unit of the brake test stand 10, respectively, further comprises a storing device for storing data received during the measurement operation and the data calculated on the basis of said received data.

The data belonging to the wheels W mounted on a common axis, e.g. the front axis of a vehicle, stored in the storing device, may be compared to the data belonging to the wheels W of the rear axis of said vehicle. Thereby the correlation results of the wheels of the front axis may be compared to the correlation results of the wheels of the rear axis. Also data of a single wheel, e.g. the right front wheel may be compared to the data of the crosswise mounted, e.g. the left rear wheel.

Also for the comparison of wheels mounted on different axis, threshold values may be given, allowing a decision whether a wheel alignment or balancer operation is still possible or allowable.

Based on the additionally sensed markers on the side walls of the tires, a change of the tires (e.g. from winter to summer tires) may be output, or in case that a defect is detected in the running surface or the side walls.

The invention claimed is:

1. A brake test stand for testing vehicle brakes and for determining the brake forces acting on the respective vehicle wheel, the brake test stand comprises:
at least a first and a second pair of rollers for positioning two wheels mounted on a common axis of a vehicle thereon, wherein the rollers of each pair of rollers are arranged opposite to each other and the pairs of rollers are provided side by side, and wherein at least one of the rollers is driven for determining the brake forces of the vehicle wheels,
a control unit for controlling the test stand, and
first sensing devices positioned respectively below and between the rollers of each pair of rollers for sensing at least the pattern of the running surface of each of the tires of the wheels mounted on the common axis,
characterized by a processing and calculation unit being adapted to process data obtained by the first sensing devices for calculating tire conditions on the basis of a correlation of the data of the tires of the wheels mounted on the common axis,
wherein the correlation includes a correlation of the variation in the brake force and changes or variations in the tread pattern of one wheel to variations in the brake force and changes or variations in the tread pattern of the other wheel.

2. The brake test stand according to claim 1, wherein the first sensing devices are a strip of light sensor.

3. The brake test stand according to claim 1, wherein the first sensing devices sense the tread depth.

4. The brake test stand according to claim 1, wherein the first sensing devices are coupled to and controlled by the control unit of the brake test stand.

5. The brake test stand according to claim 1, wherein the processing and calculation unit is adapted to calculate and create an image of the running surface of the tire.

6. The brake test stand according to claim 1, wherein the processing and calculation unit is further adapted to calculate the data for executing a wheel alignment on the basis of the data obtained by the sensing devices.

7. The brake test stand according to claim 1, wherein the first sensing devices comprise means for adjusting their position at least perpendicular and/or parallel to the axis of rotation of the rollers of the brake test stand.

8. The brake test stand according to claim 1, wherein at least the first sensing devices emit a fan-shaped light beam comprising means for adjusting at least the width of the fan shaped light beam.

9. The brake test stand according to claim 1, wherein second sensing devices are arranged laterally to the first sensing devices for sensing the side walls of the tire.

10. The brake test stand according to claim 9, wherein the second sensing devices sense structure of the side walls of the tire.

11. The brake test stand according to claim 10, wherein the first and/or the second sensing devices are coupled to and controlled by the control unit of the brake test stand.

12. The brake test stand according to claim 10, wherein the first and/or the second sensing devices comprise means for adjusting their position at least perpendicular and/or parallel to the axis of rotation of the rollers of the brake test stand.

13. A method for testing wheels on a brake test stand and for determining the brake forces acting on the respective vehicle wheel, the method comprising the steps of:
positioning the two wheels of a vehicle mounted on a common axis of said vehicle on a first and a second pair of rollers of the brake test stand,
driving at least one of the rollers of the two pairs of rollers, determining the brake forces of the vehicle wheels acting on the at least one roller, sensing at least the pattern of the running surface of each of the tires of the wheels mounted on the same axis by first sensing devices positioned below and between the rollers during a run of the wheels for testing purposes, and processing the data obtained by the first sensing devices and calculating tire conditions on the basis of a correlation of the data of the tires mounted on said common axis by a processing and calculation unit, wherein the correlation includes a correlation of the variation in the brake force and changes or variations in the tread pattern of one wheel to variations in the brake force and changes or variations in the tread pattern of the other wheel.

14. The method according to claim 13, wherein the method further comprises the step of outputting a message for the further treatment of the tires on the basis of the calculated tire conditions.

15. The method according to claim 13, wherein the calculated tire conditions include wheel alignment information.

16. The method according to claim 13, wherein the method further comprises the step of executing a wheel alignment on the basis of the data obtained by the first sensing devices.

17. The method according to claim 13, wherein a light beam emitted by the first sensing devices is fan-shaped, and the method further comprises the step of adjusting the position of the first sensing devices and/or the width of the fan-shaped light beam emitted by the first sensing devices after the two wheels of a vehicle mounted on a common axis of said vehicle have been positioned on the first and second pair of rollers of the brake test stand.

* * * * *